(12) United States Patent
Chi et al.

(10) Patent No.: US 11,846,511 B2
(45) Date of Patent: Dec. 19, 2023

(54) SAMPLING METHOD AND SYSTEM FOR PATH PLANNING OF MOBILE ROBOT IN MAN-MACHINE ENVIRONMENT

(71) Applicant: SOOCHOW UNIVERSITY, Suzhou (CN)

(72) Inventors: Wenzheng Chi, Suzhou (CN); Zhiyu Ding, Suzhou (CN); Guodong Chen, Suzhou (CN); Lining Sun, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 368 days.

(21) Appl. No.: 17/427,646

(22) PCT Filed: Apr. 28, 2020

(86) PCT No.: PCT/CN2020/087367
§ 371 (c)(1),
(2) Date: Aug. 1, 2021

(87) PCT Pub. No.: WO2021/208143
PCT Pub. Date: Oct. 21, 2021

(65) Prior Publication Data
US 2022/0316885 A1    Oct. 6, 2022

(30) Foreign Application Priority Data

Apr. 16, 2020   (CN) .......................... 202010301450.X

(51) Int. Cl.
*G01C 21/20* (2006.01)
*G05D 1/02* (2020.01)

(52) U.S. Cl.
CPC ........... *G01C 21/20* (2013.01); *G05D 1/0214* (2013.01)

(58) Field of Classification Search
CPC .. G05D 1/0214; G05D 1/0088; G05D 1/0238; G01C 21/3848
See application file for complete search history.

(56) References Cited

U.S. PATENT DOCUMENTS

| | | | |
|---|---|---|---|
| 9,400,501 B2 * | 7/2016 | Schnittman | G05D 1/0227 |
| 2006/0241827 A1 * | 10/2006 | Fukuchi | G05D 1/0274 |
| | | | 701/23 |

(Continued)

FOREIGN PATENT DOCUMENTS

| | | |
|---|---|---|
| CN | 106444769 A | 2/2017 |
| CN | 106774347 A | 5/2017 |

(Continued)

*Primary Examiner* — Ramsey Refai
(74) *Attorney, Agent, or Firm* — SZDC LAW P.C.

(57) ABSTRACT

The invention relates to a sampling method and system for path planning of a mobile robot in a man-machine environment, including: calculating a distance between a node and the closest obstacle on a map, simultaneously detecting a pedestrian in an environment and marking a position of the pedestrian; selecting a starting point position as a root node, and initializing a search tree; choosing a candidate node in a passable region, calculating a cumulative cost from a node to the candidate node, and choosing a node with the lowest cost as a growth node; performing collision detection on a connecting line between the growth and the candidate nodes, and determining whether collision detection succeeds; connecting the candidate node to the growth node, and determining whether the candidate node is a goal; and acquiring a node connecting line set from the root node to the goal to form a final path.

10 Claims, 4 Drawing Sheets

(56) References Cited

U.S. PATENT DOCUMENTS

| | | | |
|---|---|---|---|
| 2010/0145552 A1* | 6/2010 | Herman | G08G 5/0034 |
| | | | 701/3 |
| 2014/0129027 A1* | 5/2014 | Schnittman | G05D 1/0242 |
| | | | 700/253 |
| 2014/0207282 A1* | 7/2014 | Angle | B25J 13/006 |
| | | | 901/1 |
| 2017/0029213 A1* | 2/2017 | Johnson | B25J 11/008 |
| 2018/0095465 A1* | 4/2018 | Gao | G05D 1/0257 |
| 2018/0308371 A1 | 10/2018 | Cao et al. | |

FOREIGN PATENT DOCUMENTS

| | | |
|---|---|---|
| CN | 108241375 A | 7/2018 |
| CN | 109571466 A | 4/2019 |

\* cited by examiner

ABSTRACT

SAMPLING METHOD AND SYSTEM FOR PATH PLANNING OF MOBILE ROBOT IN MAN-MACHINE ENVIRONMENT

This application is the National Stage Application of PCT/CN2020/087367, filed on Apr. 28, 2020, which claims priority to Chinese Patent Application No. 202010301450.X, Apr. 16, 2020, which is incorporated by reference for all purposes as if fully set forth herein.

FIELD OF THE INVENTION

The present invention relates to the technical field of service robots, and more particularly to a sampling method and system for path planning of a mobile robot in a man-machine environment.

DESCRIPTION OF THE RELATED ART

The breakthroughs in artificial intelligence technologies have created considerable opportunities for the research of mobile service robots. At present, mobile service robots such as guidance robots, robotic vacuum cleaners, shopping guide robots, and cargo handling robots have already been successfully applied to various environments such as airports, supermarkets, museums, and homes. A path planning technology for a mobile robot is a process that the robot automatically plans a passable path according to the information of an environmental map and the position of a starting point without manual intervention. The path is usually formed by a series of nodes. Compared with an industrial robot, a service mobile robot operates in a more complex man-machine environment, is subject to more uncertainties, and has a higher real-time requirement for path planning.

There may be generally four types of existing classical path planning algorithms: a grid-based path planning algorithm, an artificial potential field-based path planning algorithm, a reward-based path planning algorithm, and a random sampling-based path planning algorithm. Because state space modeling is avoided in the random sampling-based path planning algorithm, a planning time and a memory cost are greatly reduced, so that this algorithm is more suitable for resolving a path planning problem of a dynamic man-machine environment. However, in a current sampling strategy, only relationships between internal nodes in a tree are considered, and the influence of environmental uncertainties on tree growth is ignored. For the man-machine environment in which a service mobile robot operates, the environmental uncertainties mainly include errors in environmental modeling, positioning errors of the robot, influence of moving pedestrians, and the like. Because only relationships between internal nodes in a tree are considered, the influence of environmental uncertainties on tree growth is ignored. As a result, the formed paths are unsafe and unreliable.

SUMMARY OF THE INVENTION

In view of this, the technical problem to be resolved by the present invention is to overcome the problem in the prior art that the influence of environmental uncertainties on tree growth is ignored, and as a result formed paths are unsafe and unreliable, to provide a sampling method and system for path planning of a mobile robot in a man-machine environment that introduces uncertain environmental factors and can form a safer and more reliable path.

To resolve the foregoing technical problem, a sampling method for path planning of a mobile robot in a man-machine environment in the present invention includes the following steps: calculating a distance between a node and the closest obstacle on a map, simultaneously detecting a pedestrian in an environment, and marking a position of the pedestrian in the environment; selecting a starting point position as a root node, and initializing a search tree; randomly choosing a candidate node in a passable region, calculating a cumulative cost from a node in the search tree to the candidate node, and choosing a node with the lowest cost as a growth node; performing collision detection on a connecting line between the growth node and the candidate node, and determining whether collision detection succeeds, where if yes, the process turns to Step S5, or otherwise, the process returns to Step S3; connecting the candidate node to the growth node, and determining whether the candidate node is a goal, where if yes, the process turns to Step S6, or otherwise, the process returns to Step S3; and acquiring a node connecting line set from the root node to the goal from the search tree, to form a final path.

In an embodiment of the present invention, the distance between the node and the closest obstacle on the map in Step S1 is capable of being calculated offline, and for the same map, and a calculation result is capable of being repeatedly reused in different path planning.

In an embodiment of the present invention, a method for detecting the pedestrian in the environment includes: Step S11: photographing an environmental picture by using a distributed camera network in the environment; Step S12: detecting the pedestrian by applying a pedestrian detection algorithm, to output a position of the pedestrian in a pixel coordinate system; and Step S13: outputting a position of the pedestrian in a global coordinate system through coordinate conversion according to a camera calibration result.

In an embodiment of the present invention, the node in the search tree in Step S2 includes a node position, a node connection, and a node cost, and in a process of initializing the search tree, a position of the root node is set as a starting point, a node connection is null, and a node cost is zero.

In an embodiment of the present invention, the passable region in Step S3 is a region with a value greater than zero on a closest-obstacle distance map, and a method for calculating the cumulative cost from the node in the search tree to the candidate node is: using a formula $$\mathrm{cost}(n_{new}, n_i) = \mathrm{cost}(n_i) + \frac{\varphi * dist(n_{new}, n_i) + \varepsilon * \mathrm{angle}(n_{new}, n_i)}{d_{min}^2 - \sum s_p/\pi},$$

where $n_{new}$ is the candidate node; $n_i$ is a node T in the search tree, and $n_i \in T$; $\mathrm{cost}(n_i)$ represents a cumulative cost from the root node to $n_i$; $\mathrm{dist}(\cdot)$ represents a Euclidean distance between two nodes; $\mathrm{angle}(\cdot)$ represents an included angle between two connecting lines, one of which is a connecting line between $n_{new}$ and $n_i$, and the other is a connecting line between $n_i$ and a parent node of $n_i$; $d_{min}$ represents a distance between $n_i$ and the closest obstacle; $S_p$ represents the area of a passable region occupied by the pedestrian on the connecting line between $n_{new}$ and $n_i$; and $\varphi$ and $\varepsilon$ are constants, $\varphi$ is the reciprocal of a maximum linear velocity, and $\varepsilon$ is the reciprocal of a maximum angular velocity.

In an embodiment of the present invention, the growth node is calculated by using the following formula:

$$n_{growth} = \arg\min_{n_i \in T} \text{cost}(n_{new}, n_i).$$

In an embodiment of the present invention, a method for performing collision detection on the connecting line between the growth node and the candidate node includes: Step S41: taking a set C of nodes on the connecting line between the growth node and the candidate node; and Step S42: determining whether values corresponding to all nodes in the set C on a closest-obstacle distance map are greater than zero, where if yes, no collision occurs, and collision detection succeeds; or otherwise, collision occurs, and collision detection fails.

In an embodiment of the present invention, a method for connecting the candidate node to the growth node in Step S5 includes: Step S51: recording a position of the candidate node $n_{new}$, and calculating a cost $\text{cost}(n_{new}, n_{growth})$ of the candidate node; and Step S52: setting a parent node of $n_{new}$ to $n_{growth}$; adding $n_{new}$ to a subnode list of $n_{growth}$, and establishing an association between the candidate node and a random tree.

In an embodiment of the present invention, a method for acquiring the node connecting line set from the root node to the goal from the search tree in Step S6 includes: Step S61: determining a node $n_{goal}$ where the goal is located, and setting the node as a current node $n_{current}$; Step S62: acquiring a parent node $n_{parent}$ of recurrent in the search tree, and adding $n_{parent}$ to the path; and Step S63: determining whether $n_{parent}$ is the root node, where if not, $n_{current}=n_{parent}$; and the process returns to Step S62, or if yes, the path is outputted, and search is ended.

The present invention further provides a sampling system for path planning of a mobile robot in a man-machine environment, including: an obstacle determining module, configured to: calculate a distance between a node and the closest obstacle on a map, simultaneously detect a pedestrian in an environment, and mark a position of the pedestrian in the environment; an initialization module, configured to: select a starting point position as a root node, and initialize a search tree; a choosing module, configured to: randomly choose a candidate node in a passable region, calculate a cumulative cost from a node in the search tree to the candidate node, and choose a node with the lowest cost as a growth node; a collision detection module, configured to: perform collision detection on a connecting line between the growth node and the candidate node, and determine whether collision detection succeeds; a determining module, configured to: connect the candidate node to the growth node, and determine whether the candidate node is a goal; and a setting module, configured to acquire a node connecting line set from the root node to the goal from the search tree, to form a final path.

Compared with the prior art, the foregoing technical solution of the present invention has the following advantages:

For the sampling method and system for path planning of a mobile robot in a man-machine environment of the present invention, because uncertain environmental factors including the size of a passable region around a node and the area of a passable region occupied by a pedestrian are introduced, the influence of internal relationships between nodes and environmental uncertainties on the choosing of the growth nodes is comprehensively measured, to guide a random tree to grow toward a wide region with fewer pedestrians. Therefore, problems such as that a robot gets lost or encounters collision due to environmental uncertainties are reduced, to form a safer and more reliable path.

BRIEF DESCRIPTION OF THE DRAWINGS

To make the content of the present invention clearer and more comprehensible, the present invention is further described in detail below according to specific embodiments of the present invention and the accompanying draws. Where.

DETAILED DESCRIPTION OF THE PREFERRED EMBODIMENTS

Embodiment 1

Figure 1:
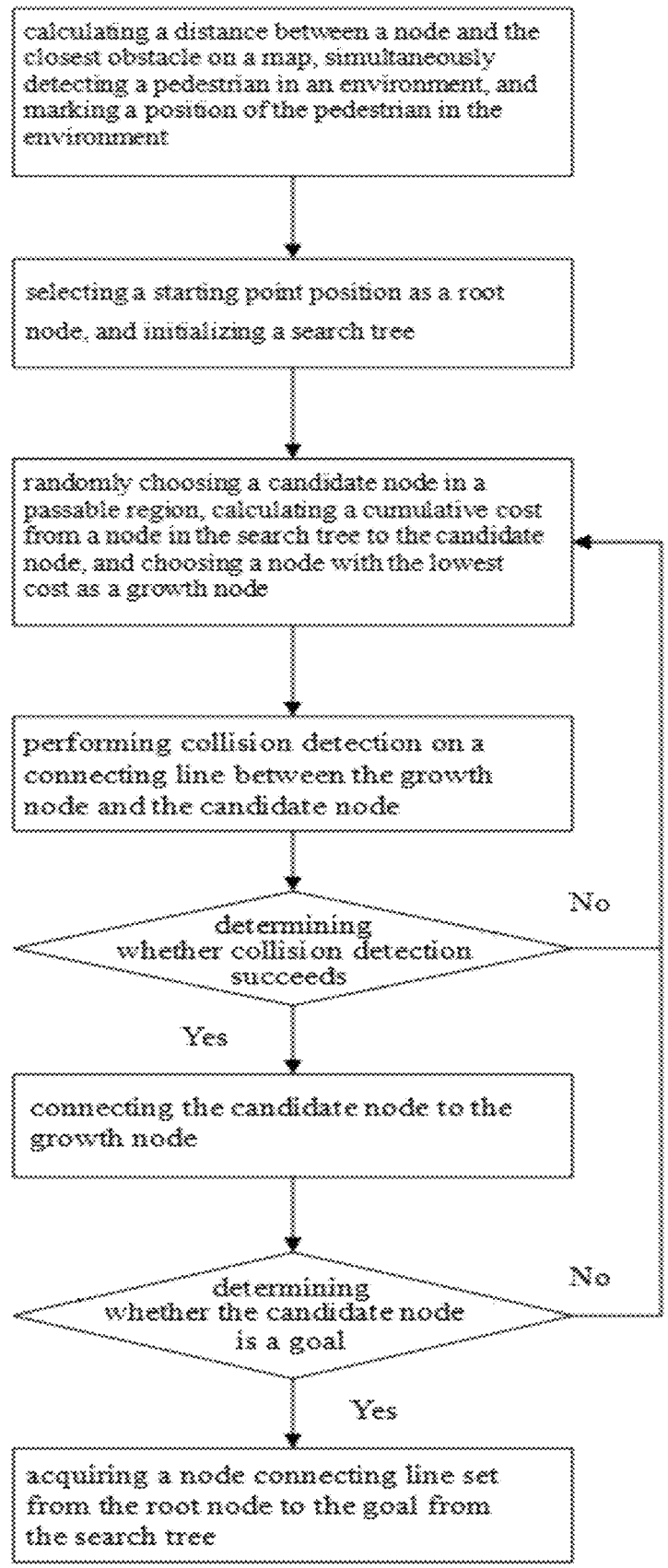
FIG. 1 is a flowchart of a sampling method for path planning of a mobile robot in a man-machine environment according to the present invention.

As shown in FIG. 1, this embodiment provides a sampling method for path planning of a mobile robot in a man-machine environment, including the following steps: Step S1: calculating a distance between a node and the closest obstacle on a map, simultaneously detecting a pedestrian in an environment, and marking a position of the pedestrian in the environment; Step S2: selecting a starting point position as a root node, and initializing a search tree; Step S3: randomly choosing a candidate node in a passable region, calculating a cumulative cost from a node in the search tree to the candidate node, and choosing a node with the lowest cost as a growth node; Step S4: performing collision detection on a connecting line between the growth node and the candidate node, and determining whether collision detection succeeds, where if yes, the process turns to Step S5, or otherwise, the process returns to Step S3; Step S5: connecting the candidate node to the growth node, and determining whether the candidate node is a goal, where if yes, the process turns to Step S6, or otherwise, the process returns to Step S3; and Step S6: acquiring a node connecting line set from the root node to the goal from the search tree, to form a final path.

The sampling method for path planning of a mobile robot in a man-machine environment in this embodiment includes: Step S1: calculating a distance between a node and the closest obstacle on a map, to help to determine a stationary obstacle, simultaneously detecting a pedestrian in an environment, and marking a position of the pedestrian in the environment, to help to determine a moving obstacle; Step S2: selecting a starting point position as a root node, and initializing a search tree, to help to add a starting point to the search tree; Step S3: randomly choosing a candidate node in a passable region, calculating a cumulative cost from a node in the search tree to the candidate node, and choosing a node with the lowest cost as a growth node, to help to ensure the lowest cost from the root node to a current node; Step S4:

performing collision detection on a connecting line between the growth node and the candidate node, and determining whether collision detection succeeds, where if yes, the process turns to Step S5, or otherwise, the process returns to Step S3, to help to ensure that there is no obstacle between the growth node and the candidate node; Step S5: connecting the candidate node to the growth node, and determining whether the candidate node is a goal, where if yes, the process turns to Step S6, or otherwise, the process returns to Step S3, to help to determine a goal; and Step S6: acquiring a node connecting line set from the root node to the goal from the search tree, to form a final path. Because in the present invention, uncertain environmental factors including the size of a passable region around a node and the area of a passable region occupied by a pedestrian are introduced, the influence of internal relationships between nodes and environmental uncertainties on the choosing of the growth nodes is comprehensively measured, to guide a search tree to grow toward a wide region with fewer pedestrians. Therefore, problems such as that a robot gets lost or encounters collision due to environmental uncertainties are reduced, to form a safer and more reliable path.

Figure 2A:
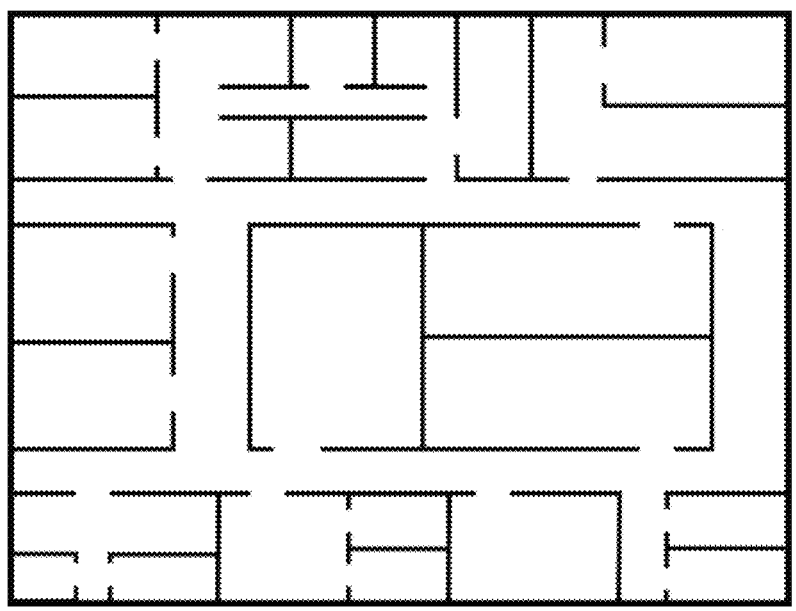
FIG. 2a is a schematic diagram of an environmental map according to the present invention.
Figure 2B:
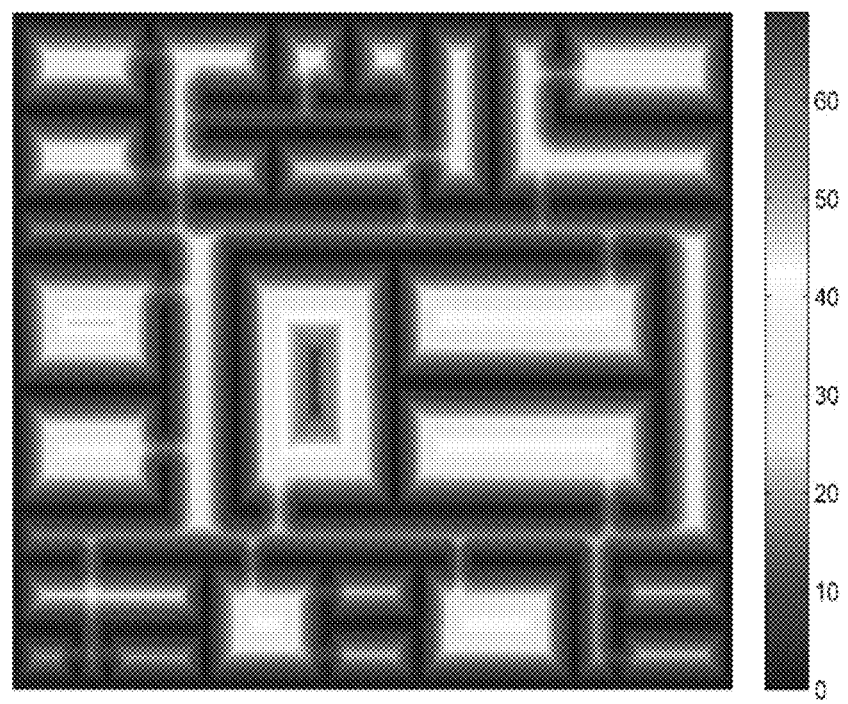
FIG. 2b shows an environmental map and a distance to the closest obstacle corresponding to the environmental map according to the present invention.

As shown in FIG. 2a and FIG. 2b, in Step S1, a two-dimensional grid map is used. In FIG. 2b, the unit of the distance is a quantity of grids, and a region with a distance to the closest obstacle being greater than zero is the passable region. The distance between the node and the closest obstacle on the map is capable of being calculated offline, and for the same map, and a calculation result is capable of being repeatedly reused in different path planning, thereby helping to increase a calculation speed.

In addition, a method for detecting the pedestrian in the environment includes:

Step S11: photographing an environmental picture by using a distributed camera network in the environment;

Step S12: detecting the pedestrian by applying a pedestrian detection algorithm, to output a position of the pedestrian in a pixel coordinate system; and Step S13: outputting a position of the pedestrian in a global coordinate system through coordinate conversion according to a camera calibration result.

In a variant, pedestrian detection may be alternatively implemented by using another sensor such as a laser sensor.

The node in the search tree in Step S2 includes a node position, a node connection, and a node cost, and in a process of initializing the search tree, a position of the root node is set as a starting point, a node connection is null, and a node cost is zero, so that a starting point can be added to the search tree. Therefore, after the search tree is initialized, only the root node is included.

The passable region in Step S3 is a region with a value greater than zero on a closest-obstacle distance map, and A method for randomly choosing the candidate node in the passable region is: assigning a unique index number to a node in the passable region, and randomly choosing one index number, where a node corresponding to the index number is the candidate node.

A method for calculating the cumulative cost from the node in the search tree to the candidate node is: using a formula $$\text{cost}(n_{new}, n_i) = \text{cost}(n_i) + \frac{\varphi * dist(n_{new}, n_i) + \varepsilon * \text{angle}(n_{new}, n_i)}{d_{min}^2 - \sum s_p/\pi},$$

where $n_{new}$ is the candidate node; $n_i$ is a node T in the search tree, and $n_i \in T$; cost($n_i$) represents a cumulative cost from the root node to $n_i$; dist(·) represents a Euclidean distance between two nodes; angle(·) represents an included angle between two connecting lines, one of which is a connecting line between $n_{new}$ and $n_i$, and the other is a connecting line between $n_i$ and a parent node of $n_i$; $d_{min}$ represents a distance between $n_i$ and the closest obstacle; $S_p$ represents the area of a passable region occupied by the pedestrian on the connecting line between $n_{new}$ and $n_i$; and $\varphi$ and $\varepsilon$ are constants, and are used for measuring the influence of distance and angle differences on a cost. For a robot, $\varphi$ is the reciprocal of a maximum linear velocity, and $\varepsilon$ is the reciprocal of a maximum angular velocity. When $d_{min}$ is larger, it indicates that the passable region around $n_i$ is larger. When a quantity of pedestrians is smaller, the passable region occupied by $\Sigma S_p$ is smaller, and the robot operates more safely.

The growth node is calculated by using the following formula:

$$n_{growth} = \arg\min_{n_i \in T} \text{cost}(n_{new}, n_i).$$

Nodes in the search tree are traversed to select a node with the lowest cumulative cost to the candidate node as the growth node of the candidate node, thereby helping to ensure the lowest cost from the root node to a current node.

Figure 3:
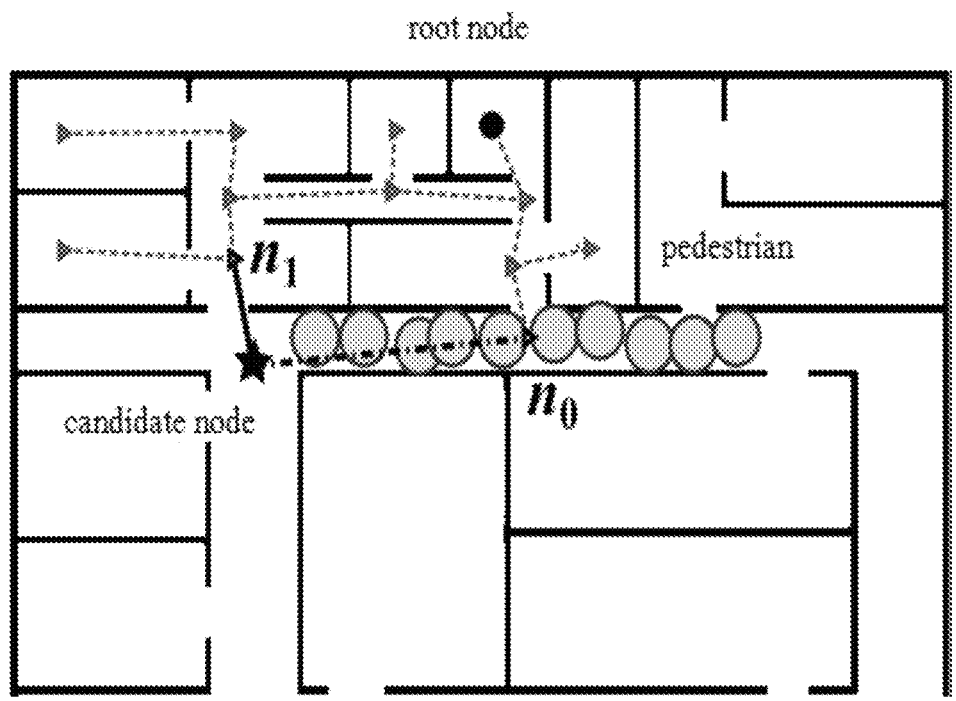
FIG. 3 is a schematic diagram of a process of selecting a growth node according to the present invention.

As shown in FIG. 3, a circle represents the root node, a triangle represents another node in the search tree, a star represents the candidate node, a gray circle represents a pedestrian, a solid line represents a connection from a node $n_0$ to the candidate node, and a dash dotted line represents a connection from a node $n_1$ to the candidate node. Because there are a plurality of pedestrians on a connecting line between $n_0$ and the candidate node, that is, the value of $\Sigma S_p$ is relatively large, a cumulative cost from $n_0$ to the candidate node is greater than a cumulative cost from $n_1$ to the candidate node. Therefore, $n_1$ is selected as the growth node.

A method for performing collision detection on the connecting line between the growth node and the candidate node in Step S4 includes:

Step S41: taking a set C of nodes on the connecting line between the growth node and the candidate node; and Step S42: determining whether values corresponding to all nodes in the set C on a closest-obstacle distance map are greater than zero, where if yes, no collision occurs, and collision detection succeeds; or otherwise, collision occurs, and collision detection fails.

During the foregoing collision detection, it is preferentially selected to detect only a stationary obstacle. For an environment with heavy traffic, it is highly probable that a connecting line collides with a pedestrian, and at the same time, collision detection on a moving pedestrian tends to cause reduced planning efficiency or even a planning failure. Therefore, for a growth process of the search tree, collision detection of a moving obstacle can be skipped.

Figure 4:
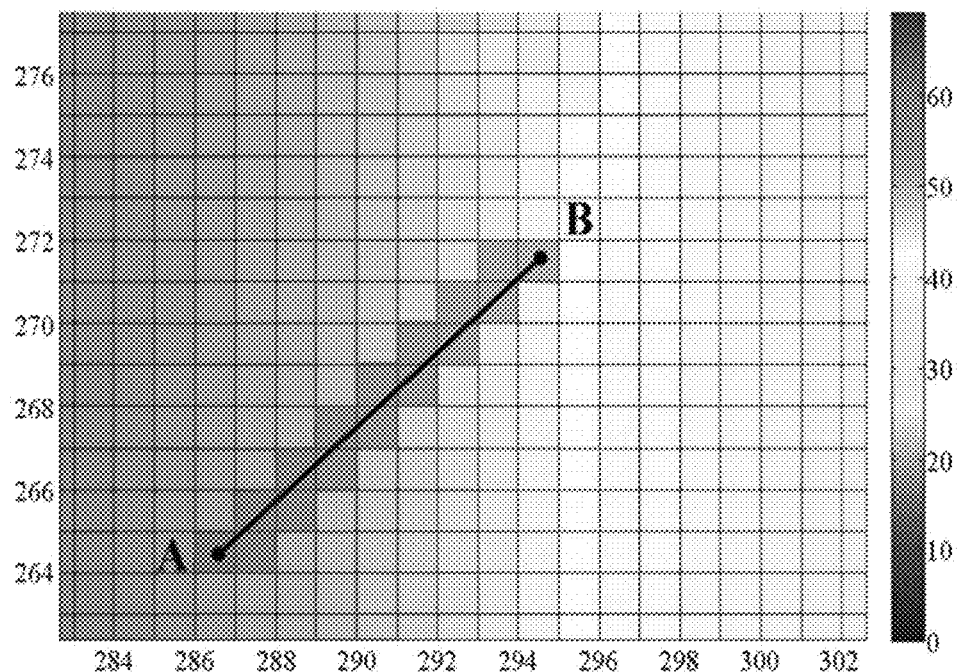
FIG. 4 is a schematic diagram of collision detection based on a distance to the closest obstacle according to the present invention.

FIG. 4 is a schematic diagram of collision detection from a node A to a node B. First, the two nodes A and B are mapped to a closest-obstacle distance map. Grids through which a connecting line AB passes are chosen, as shown by gray squares in the figure. The values of the gray squares are traversed. If all the values are greater than zero, no collision occurs, and collision detection succeeds; or otherwise, collision occurs, and collision detection fails.

A method for connecting the candidate node to the growth node in Step S5 includes:

Step S51: recording a position of the candidate node $n_{new}$, and calculating a cost $cost(n_{new}, n_{growth})$ of the candidate node; and Step S52: setting a parent node of $n_{new}$ to $n_{growth}$, adding $n_{new}$ to a subnode list of $n_{growth}$, and establishing an association between the candidate node and a random tree.

A method for acquiring the node connecting line set from the root node to the goal from the search tree in Step S6 includes:

Step S61: determining a node $n_{goal}$ where the goal is located, and setting the node as a current node $n_{current}$;

Step S62: acquiring a parent node $n_{parent}$ of $n_{current}$ in the search tree, and adding $n_{parent}$ to the path; and Step S63: determining whether $n_{parent}$ is the root node, where if not, $n_{current}=n_{parent}$; and the process returns to Step S62, or if yes, the path is outputted, and search is ended.

Figure 5:
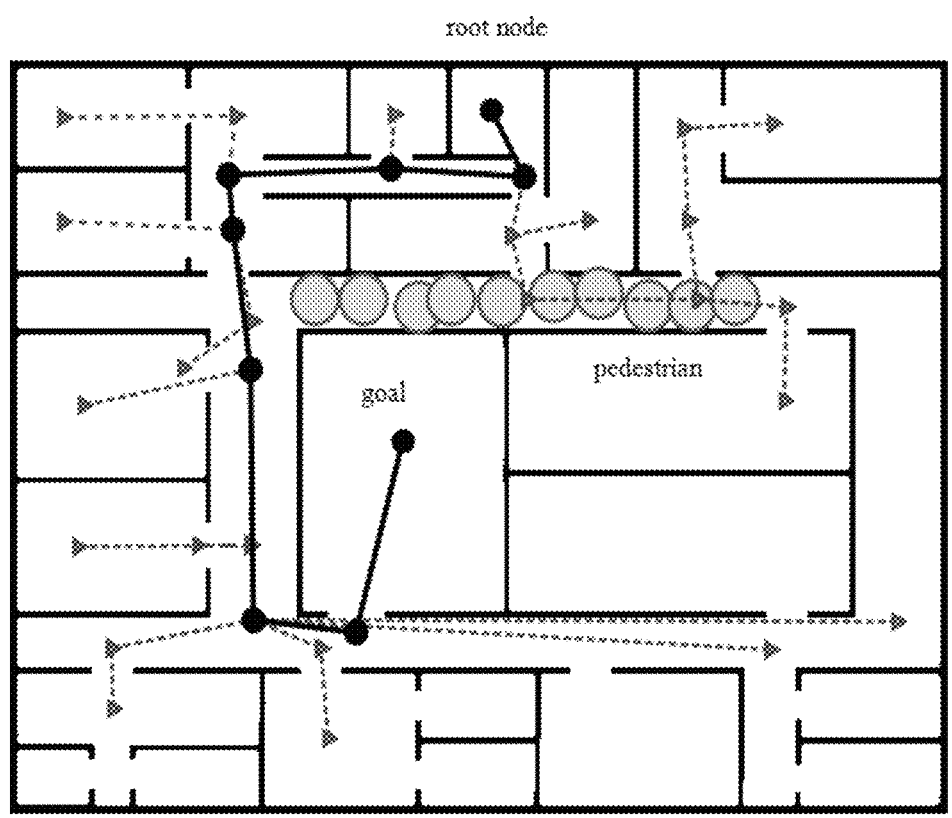
FIG. 5 is a schematic diagram of a search tree and a generation path according to the present invention.

As shown in FIG. 5, a circular node solid line represents an eventually generated path, a triangle represents a node in the search tree, a dotted line represents a connecting relationship between nodes in the search tree, and a gray circle represents a pedestrian. A path planning strategy can avoid a region with a relatively large number of pedestrians, to generate a safer and reliable path.

Embodiment 2

Based the same inventive concept, this embodiment provides a sampling system for path planning of a mobile robot in a man-machine environment. The problem-solving principle of the sampling system is the same as that of the sampling method for path planning of a mobile robot in a man-machine environment. Details are no longer repeated.

The sampling system for path planning of a mobile robot in a man-machine environment in this embodiment includes:

an obstacle determining module, configured to: calculate a distance between a node and the closest obstacle on a map, simultaneously detect a pedestrian in an environment, and mark a position of the pedestrian in the environment;

an initialization module, configured to: select a starting point position as a root node, and initialize a search tree;

a choosing module, configured to: randomly choose a candidate node in a passable region, calculate a cumulative cost from a node in the search tree to the candidate node, and choose a node with the lowest cost as a growth node;

a collision detection module, configured to: perform collision detection on a connecting line between the growth node and the candidate node, and determine whether collision detection succeeds;

a determining module, configured to: connect the candidate node to the growth node, and determine whether the candidate node is a goal; and a setting module, configured to acquire a node connecting line set from the root node to the goal from the search tree, to form a final path.

A person skilled in the art should understand that the embodiments of the present application may be provided as a method, a system or a computer program product. Therefore, the present application may use a form of hardware embodiments, software embodiments, or embodiments with a combination of software and hardware. Moreover, the present application may use a form of a computer program product that is implemented on one or more computer-usable storage media (including but not limited to a disk memory, a CD-ROM, an optical memory, and the like) that include computer usable program code.

The present application is described with reference to the flowcharts and/or block diagrams of the method, the device (system), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, the foregoing embodiments are merely examples for clear description, rather than a limitation to implementations. For a person of ordinary skill in the art, other changes or variations in different forms may also be made based on the foregoing description. All implementations cannot and do not need to be exhaustively listed herein. Obvious changes or variations that are derived there from still fall within the protection scope of the present invention.

What is claimed is:

1. A sampling method for path planning of a mobile robot in a man-machine environment, comprising steps of:

Step S1: calculating a distance between a node and the closest obstacle on a map, simultaneously detecting a pedestrian in an environment, and marking a position of the pedestrian in the environment;

Step S2: selecting a starting point position as a root node, and initializing a search tree;

Step S3: randomly choosing a candidate node in a passable region, calculating a cumulative cost from a node in the search tree to the candidate node, and choosing a node with the lowest cost as a growth node;

Step S4: performing collision detection on a connecting line between the growth node and the candidate node, and determining whether collision detection succeeds, wherein if yes, the process turns to Step S5, or otherwise, the process returns to Step S3;

Step S5: connecting the candidate node to the growth node, and determining whether the candidate node is a goal, wherein if yes, the process turns to Step S6, or otherwise, the process returns to Step S3; and Step S6: acquiring a node connecting line set from the root node to the goal from the search tree, to form a final path.

2. The sampling method for path planning of a mobile robot in a man-machine environment according to claim 1, wherein the distance between the node and the closest obstacle on the map in Step S1 is capable of being calculated offline, and for the same map, and a calculation result is capable of being repeatedly reused in different path planning.

3. The sampling method for path planning of a mobile robot in a man-machine environment according to claim 1, wherein a method for detecting the pedestrian in the environment comprises:

Step S11: photographing an environmental picture by using a distributed camera network in the environment;

Step S12: detecting the pedestrian by applying a pedestrian detection algorithm, to output a position of the pedestrian in a pixel coordinate system; and Step S13: outputting a position of the pedestrian in a global coordinate system through coordinate conversion according to a camera calibration result.

4. The sampling method for path planning of a mobile robot in a man-machine environment according to claim 1, wherein the node in the search tree in Step S2 comprises a node position, a node connection, and a node cost, and in a process of initializing the search tree, a position of the root node is set as a starting point, a node connection is null, and a node cost is zero.

5. The sampling method for path planning of a mobile robot in a man-machine environment according to claim 1, wherein the passable region in Step S3 is a region with a value greater than zero on a closest-obstacle distance map, and a method for calculating the cumulative cost from the node in the search tree to the candidate node is: using a formula $$\text{cost}(n_{new}, n_i) = \text{cost}(n_i) + \frac{\varphi * dist(n_{new}, n_i) + \varepsilon * \text{angle}(n_{new}, n_i)}{d_{min}^2 - \sum s_p/\pi},$$

wherein $n_{new}$ is the candidate node; $n_i$ is a node T in the search tree, and $n_i \in T$; $\text{cost}(n_i)$ represents a cumulative cost from the root node to $n_i$; $dist(\cdot)$ represents a Euclidean distance between two nodes; $\text{angle}(\cdot)$ represents an included angle between two connecting lines, one of which is a connecting line between $n_{new}$ and $n_i$, and the other is a connecting line between $n_i$ and a parent node of $n_i$; $d_{min}$ represents a distance between $n_i$ and the closest obstacle; $S_p$ represents the area of a passable region occupied by the pedestrian on the connecting line between $n_{new}$ and $n_i$; and $\varphi$ and $\varepsilon$ are constants, $\varphi$ is the reciprocal of a maximum linear velocity, and $\varepsilon$ is the reciprocal of a maximum angular velocity.

6. The sampling method for path planning of a mobile robot in a man-machine environment according to claim 5, wherein the growth node is calculated by using the following formula:

$$n_{growth} = \arg\min_{n_i \in T} \text{cost}(n_{new}, n_i).$$

7. The sampling method for path planning of a mobile robot in a man-machine environment according to claim 1, wherein a method for performing collision detection on the connecting line between the growth node and the candidate node comprises:

Step S41: taking a set C of nodes on the connecting line between the growth node and the candidate node; and Step S42: determining whether values corresponding to all nodes in the set C on a closest-obstacle distance map are greater than zero, wherein if yes, no collision occurs, and collision detection succeeds; or otherwise, collision occurs, and collision detection fails.

8. The sampling method for path planning of a mobile robot in a man-machine environment according to claim 1, wherein a method for connecting the candidate node to the growth node in Step S5 comprises:

Step S51: recording a position of the candidate node $n_{new}$, and calculating a cost $\text{cost}(n_{new}, n_{growth})$ of the candidate node; and Step S52: setting a parent node of $n_{new}$ to $n_{growth}$, adding $n_{new}$ to a subnode list of $n_{growth}$, and establishing an association between the candidate node and a random tree.

9. The sampling method for path planning of a mobile robot in a man-machine environment according to claim 1, wherein a method for acquiring the node connecting line set from the root node to the goal from the search tree in Step S6 comprises:

Step S61: determining a node $n_{goal}$ where the goal is located, and setting the node as a current node $n_{current}$;

Step S62: acquiring a parent node $n_{parent}$ of $n_{current}$ in the search tree, and adding $n_{parent}$ to the path; and Step S63: determining whether $n_{parent}$ is the root node, wherein if not, $n_{current} = n_{parent}$, and the process returns to Step S62, or if yes, the path is outputted, and search is ended.

10. A sampling system for path planning of a mobile robot in a man-machine environment, comprising:

an obstacle determining module, configured to: calculate a distance between a node and the closest obstacle on a map, simultaneously detect a pedestrian in an environment, and mark a position of the pedestrian in the environment;

an initialization module, configured to: select a starting point position as a root node, and initialize a search tree;

a choosing module, configured to: randomly choose a candidate node in a passable region, calculate a cumulative cost from a node in the search tree to the candidate node, and choose a node with the lowest cost as a growth node;

a collision detection module, configured to: perform collision detection on a connecting line between the growth node and the candidate node, and determine whether collision detection succeeds;

a determining module, configured to: connect the candidate node to the growth node, and determine whether the candidate node is a goal; and a setting module, configured to acquire a node connecting line set from the root node to the goal from the search tree, to form a final path.

* * * * *